United States Patent
Pesquet-Popescu

(10) Patent No.: US 6,381,276 B1
(45) Date of Patent: Apr. 30, 2002

(54) VIDEO ENCODING AND DECODING METHOD

(75) Inventor: Béatrice Pesquet-Popescu, Fontenay-sous-Bois (FR)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/829,342

(22) Filed: Apr. 9, 2001

(30) Foreign Application Priority Data

Apr. 11, 2000 (EP) .......................................... 00401004

(51) Int. Cl.$^7$ ................................................. H04N 7/12

(52) U.S. Cl. .............................. 375/240.11; 375/240.29

(58) Field of Search ..................... 375/240.11, 240.16, 375/240.21, 240.29; 348/398.1, 402.1, 407.1, 413.1, 412.1, 415.1; 382/260, 265; H04N 7/12

(56) References Cited

U.S. PATENT DOCUMENTS 5,121,191 A * 6/1992 Cassereau et al. .......... 348/443
5,301,020 A * 4/1994 Cassereau .............. 375/240.12

OTHER PUBLICATIONS

B. Pesquet–Popescu, "Three–Dimensional Lifting Schemes for Motion Compensated Video Compression", pp. 1793–1796.

* cited by examiner

Primary Examiner—Nhon T. Diep
(74) Attorney, Agent, or Firm—Russell Gross

(57) ABSTRACT

The invention relates to a method for encoding a sequence of frames by means of a three-dimensional (3D) subband decomposition involving a spatial and temporal filtering step. The decomposition is applied to successive groups of frames only after the implementation, on the frames, of motion estimation and compensation operations in the low temporal subbands at each level of the temporal decomposition. A motion compensated temporal filtering step between a previous reference frame A and a current frame B comprises in a first time a computation sub-step of the high frequency subband, followed by a computation sub-step of the low frequency subband. This filtering step is followed by an identification step of regions uncovered during motion, as being related to double-connected pixels, and this identification step is itself followed by a decision step, provided for choosing in the current frame, for the temporal filtering of a double-connected pixel of the reference frame, the corresponding pixel that leads to a minimum energy of the detail subband. The invention also relates to the corresponding decoding method.

2 Claims, 1 Drawing Sheet

VIDEO ENCODING AND DECODING METHOD

FIELD OF THE INVENTION

The present invention relates to a method for encoding a sequence of frames by means of a three-dimensional (3D) subband decomposition involving a spatial and temporal filtering step applied to the 3D spatio-temporal data which correspond to said sequence of frames considered as a 3D volume, said decomposition being applied to successive groups of frames only after the implementation, on said frames, of motion estimation and compensation operations in the low temporal subbands at each level of the temporal decomposition, the compensation operation leading, among the filtering pixels, to double-connected pixels corresponding to regions becoming uncovered during motion. The invention also relates to a method for decoding signals previously coded by means of such an encoding method.

BACKGROUND OF THE INVENTION

Video compression schemes operate by removing redundant information from the signals before their transmission and then reconstructing, at the decoder side, an approximation of the image from the remaining compressed information. The temporal redundancy corresponds to the fact that pixel values are not independent but are correlated with their neighbours across successive frames. The reduction of this temporal redundancy is mainly achieved by two types of approaches: the "hybrid" or predictive approach, according to which a prediction of the current frame is computed based on the previously transmitted frames and only the prediction error, i.e. the difference between the current frame and its prediction, is intra-coded and transmitted, and the three-dimensional (3D, or 2D+t) approach in which the temporal redundancy is exploited by means of a temporal transform, in a similar way to the spatial techniques for removing the spatial redundancy (which corresponds to the fact that pixel values are not independent within the same frame).

In this 3D approach, the sequence of frames is processed as a 3D volume and thus the classical subband decomposition used in image coding can be extended to 3D spatio-temporal data by using separable transforms, for example wavelet or wavelet packets transforms implemented by means of filter banks. There is an anisotropy in such a 3D structure, but it can be taken into account by using different filter banks in the spatial and temporal directions (usually, Haar filters are used for temporal filtering since the added delay of using longer filters is undesirable ; furthermore, Haar filters are the only perfect reconstruction orthogonal filters which do not present the boundaries effect, since they are two-tap filters).

The coding efficiency of such a 3D coding scheme can be improved by performing motion estimation/compensation in the low temporal subbands at each level of the temporal decomposition. It was shown, for instance in "Three-dimensional subband coding with motion compensation", by J. R. Ohm, IEEE Transactions on Image Processing, vol. 3, No5, September 1994, pp.559–571, that motion-compensated 3D subband coding leads to better visual and peak signal-to-noise ratio (PSNR) results than classical predictive schemes, for a given bitrate (in said document, a 3D subband decomposition with full motion compensation is performed using Haar filters in the temporal domain and a 2D discrete wavelet transform—or DWT—in the spatial domain).

However, the motion compensation raises the problem of points which are filtered twice or not filtered at all, as illustrated in FIG. 1. In the left part of FIG. 1, A and B respectively designate previous and current frames, and (a1 to a6), (b1 to b6) are pixels of said frames respectively (BBY=block boundary). The right part of FIG. 1 illustrates the process of motion compensation temporal filtering combined with block matching. As the connected pixels are filtered along the motion trajectory, and as matched blocks overlap with neighbouring blocks (except in case of no motion or translational motion), double-connected and unconnected pixels generally appear.

The strategy adopted in said document to cope with unconnected pixels is the following: for an unconnected pixel in the current frame (like $b_1$), the original pixel value is inserted into the temporal low (L) subband. An unconnected pixel in the previous frame (like $a_3$ and a4) is related to the same motion vector as its neighbours. The result of the high-pass filtering in the motion direction is put into the temporal high (H) subband at the unconnected pixel location (in the case of Haar filters, this represents the displaced frame difference). It is also proposed to perform the motion compensated prediction for the unconnected pixels in the previous frame by using the reconstructed frame just previous to it. Temporal subbands resulting from filtering replace the original frames: the temporal low (L) subband takes the place of the current frame, and the temporal high (H) subband replaces the reference frame.

Another method to cope with unconnected pixels is described in the document "Motion-compensated 3-D subband coding of video", by S. J. Choi and al, IEEE Transactions on Image Processing, vol. 8, no2, February 1999, pp.155–167, with reference to FIG. 2. For an unconnected pixel in the previous frame (like $a_3$ and a4 ), the original value is inserted into the temporal low subband, which gives better visual results than the strategy defined in the first cited document. For an unconnected pixel in the current frame (like b1), a DFD (displaced frame difference) value is taken. By making the direction of motion estimation agree with that of motion compensation, the best available motion vector can be used for this DFD value, without the need of an additional motion estimation. The temporal subbands are relocated differently, as shown in the right part of FIG. 2: temporal low (L) subband replaces the reference frame, while temporal high (H) subband replaces the current frame. This is better suited in the case of unconnected pixels than the strategy of the first cited document, since the high-frequency subbands have smaller energy and are compatible with a DFD value for the unconnected pixels.

To sum up this approach, the following relations (1) to (3) are used:

$$H[m, n] = \frac{1}{\sqrt{2}}(B[m, n] - \tilde{A}[m - d_m, n - d_n]), \quad (1)$$

-continued $$L[m - \bar{d}_m, n - \bar{d}_n] = \frac{1}{\sqrt{2}} (\tilde{B}[m - \bar{d}_m + d_m] + \quad (2)$$

$$A[m - \bar{d}_m, n - \bar{d}_n]) \text{ for connecting pixels,}$$

and $\quad L[m, n] = \sqrt{2} \cdot A[m, n] \quad$ for unconnected pixels, $\quad$ (3)

where (m,n) designates the position of the pixels, H[m,n], L[m,n] are temporal high- and low-subbands, A[m,n], B[m,n] are the previous and current frames, $[d_m, d_n]$ is for a pixel the motion vector estimated between the two considered consecutive frames A and B, $\bar{d}_m, \bar{d}_n$ are the nearest integers to $d_m, d_n$, and , $\tilde{B}$ are interpolated values if motion pixels are subpixel accurate. In case of multiple connected pixels, A is calculated with the first pair (A, B) encountered.

In fact, the problem of unconnected and double connected pixels appears as closely related to that of covered/uncovered areas during motion. Indeed, when two objects having a common part in the frame at time T become separate at time T+1, two regions in the current frame will correspond, by motion compensation, to the same region in the reference frame: this is the uncovered area, that appears as double connected in the case of the previous analysis giving the relations (1) to (3). A possible situation is illustrated in FIG. 3, where FA designates a foreground area, belonging to a foreground object 1, and UR the uncovered area of a background object 2 when said regions become distinct (i.e. they do not overlap). The approach described in the second document associates to these pixels the first block encountered in the motion estimation process.

SUMMARY OF THE INVENTION

It is the object of the invention to propose an optimized solution with respect to the previously described approach.

To this end, the invention relates to an encoding method such as defined in the introductive part of the description and which is moreover characterized in that it comprises the following steps:

(1) a motion compensated temporal filtering step between a previous reference frame A and a current frame B, said step itself comprising in a first time a computation sub-step of the high frequency subband, followed by a computation sub-step of the low frequency subband, using only the reference frame A and the previously computed high frequency subband, said computations being carried out according to the following relations:

H[m,n]=(B[m,n]-Ã[m-d$_m$,n-d$_n$])/√2,

L[m-d̄$_m$,n-d̄$_n$]=H̃[m-d̄$_m$+d$_m$,n-d̄$_n$+d$_n$]+√√2A[m-d̄$_m$,n-d̄$_n$] for connected pixels, L [m, n]=√2.A[m,n] for unconnected pixels,  (c)

where (m,n) designates the position of the pixels, H[m,n], L[m,n] are temporal high- and low-subbands, A[m,n], B[m,n] are the consecutive previous and current frames, [dm, dn] is for a pixel the motion vector estimated between the frames A and B, d̄m, d̄n are the nearest integers to dm, dn, and, Ã, H̃ are interpolated values;

(2) an identification step of said uncovered regions as being related to double-connected pixels, those pixels leading to a minimum energy in the detail subband;

(3) a decision step, provided for choosing in the current frame, for the temporal filtering of a double-connected pixel of the reference frame, the corresponding pixel that leads to a minimum energy of the detail subband..

If two objects 1 and 2 are superposed in the reference frame (left part of FIG. 3), there is an occluded area in one of them and only the foreground area FA belonging to the other is available. If these objects become separated (right part of FIG. 3) in the current frame, the motion estimation algorithm will identify two regions in the current frame for compensation. As the real motion corresponds to the foreground area in object 1, the uncovered area UA in object 2 will give rise to a higher energy of the detail subband, which represents the difference between the compensated reference frame and the current frame. Indeed, if the real motion corresponds to the object 1, this difference will be very small in the case of the foreground area and high for the uncovered area in object 2. According to the invention, this observation is used to choose the correct pixel for the temporal filtering process.

The invention also relates to a method for decoding digital signals previously coded by such a method, said decoding method being characterized in that the reconstruction of the pixels of the reference and current frames A and B is obtained by means of computation steps based on the values of the corresponding pixels in the low and high frequency subbands, said computations being made according to the following relations:

$$A[m - \bar{d}_m, n - \bar{d}_n] =$$
$$\frac{1}{\sqrt{2}} (L[m - \bar{d}_m, n - \bar{d}_n] - \tilde{H}[m - \bar{d}_m + d_m, n - \bar{d}_n + d_n])$$

(for connected pixels)

$$A[m, n] = \frac{1}{\sqrt{2}} \cdot L[m, n] \qquad \text{(for unconnected pixels)}$$

$$B[m, n] = \sqrt{2} \, H[m, n] + \tilde{A}[m - d_m, n - d_n]. \qquad (c)$$

BRIEF DESCRIPTION OF THE DRAWINGS

The present invention will now be described, by way of example, with reference, if necessary, to the accompanying drawings in which.

DETAILED DESCRIPTION OF THE INVENTION

Figure 1:
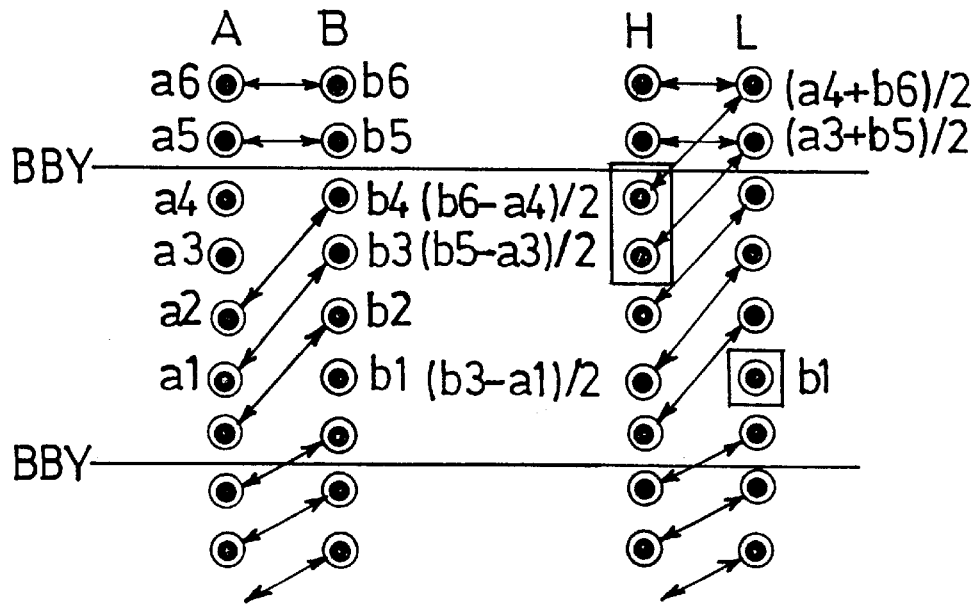
FIG. 1 illustrates the problem of "unconnected" and "double connected" pixels and relates to a first strategy for solving said problem.
Figure 2:
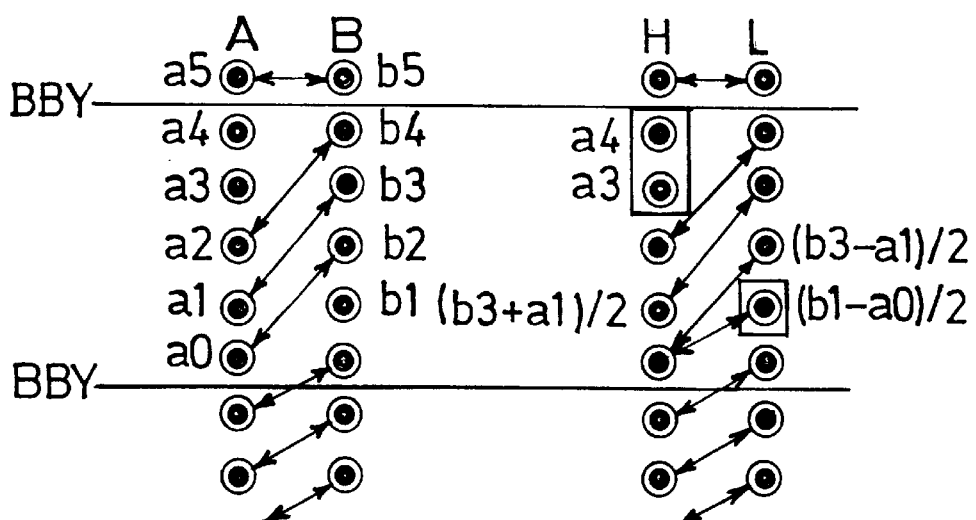
FIG. 2 relates to another strategy for solving this problem.
Figure 3:
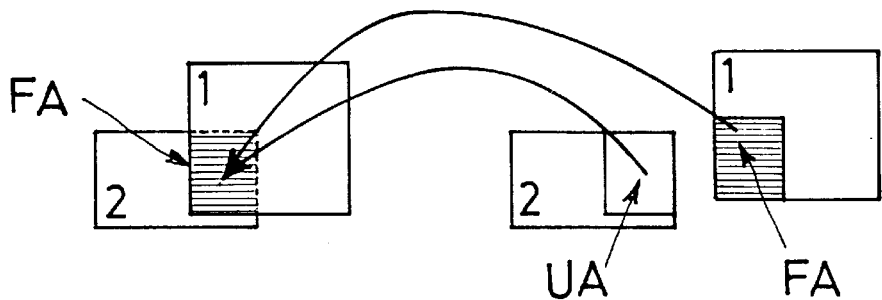
FIG. 3 illustrates the problem of uncovered regions.

The basic principle of the invention is first to provide an original analysis of the motion compensated temporal filtering, by expressing differently the relations that allow to compute the approximation and the detail subbands of the temporal analysis. It is then showed that, in order to perform this computation, it is possible to choose, between the pixels connected to the same pixel in the reference subband, the one corresponding to the real motion. The region formed by these pixels minimizes the energy of the high frequency subband.

It indeed appears that the relation (2) can be re-written as follows:

$$L[m-\bar{d}_m,n-\bar{d}_n]=\tilde{H}[m-\bar{d}_m+d_m,n-\bar{d}_n+d_n]+\sqrt{2}A[m-\bar{d}_m,n-\bar{d}_n] \quad (4)$$

for connected pixels. It allows to compute in a first time the high frequency subband, using the relation (1), and then the low frequency subband, using only the reference frame and the previously computed high frequency subband, as in the relation (4). In what concerns the synthesis part, the relations (1), (4), (3) can be easily used to obtain perfect reconstruction of the pixels in the reference and current frames, based on the values of the corresponding pixels in the low and high frequency subbands:

$$A[m-\bar{d}_m, n-\bar{d}_n] = \frac{1}{\sqrt{2}}(L[m-\bar{d}_m, n-\bar{d}_n] - \tilde{H}[m-\bar{d}_m+d_m, n-\bar{d}_n+d_n]) \quad (5)$$

for connected pixels, and $$A[m,n] = \frac{1}{\sqrt{2}} \cdot L[m,n] \quad \text{for unconnected pixels.} \quad (6)$$

Once the values in the reference frame are available, the current frame values can be computed:

$$B[m,n]=\sqrt{2}H[m,n]+\tilde{A}[m-d_m,n-d_n]. \quad (7)$$

In the case of a double connected pixel in the reference frame (for instance the pixel at the position (p,q)) and considering the two pixels found by the motion estimation algorithm at the positions (m1,n1) and (m2,n2), that means, if the two corresponding motion vectors are $(d_{m1}, d_{n1})$ and $(d_{m2},d_{n2})$:

$$m1-\bar{d}_{m1}=m2-\bar{d}_{m2}=p \quad (8)$$

$$n1-\bar{d}_{n1}=n2-\bar{d}_{n2}= \quad (9)$$

The previous relations (1) and (4) can then be applied to each of the two pairs:

$$\begin{cases} H[m1, n1] = \frac{1}{\sqrt{2}}(B[m1, n1] - \tilde{A}[m1 - d_{m1}, n1 - d_{n1}]) & (10) \\ L[p, q] = \tilde{H}[m1 - \bar{d}_{m1} + d_{m1}, n1 - \bar{d}_{n1} + d_{n1}] + \sqrt{2} A[p, q] & (11) \end{cases}$$

and $$\begin{cases} H[m2, n2] = \frac{1}{\sqrt{2}}(B[m2, n2] - \tilde{A}[m2 - d_{m2}, n2 - d_{n2}]) & (12) \\ L[p, q] = \tilde{H}[m2 - \bar{d}_{m2} + d_{m2}, n2 - \bar{d}_{n2} + d_{n2}] + \sqrt{2} A[p, q] & (13) \end{cases}$$

It may then be noted that the value in the detail subband is different for the two pixels in the current frame. Consequently, the value in the approximation subband can be computed using either of these two values. Both of them allow perfect reconstruction, by first computing the value in the reference frame and then exploiting the relation (7) to compute the values in the current frame.

As described above, one of the two areas corresponds to the real object motion and the other one becomes uncovered owing to the same motion. The first case leads to minimum energy in the high frequency subband, the uncovered area having a different value of that in the foreground area. Therefore, one criterion for the choice of the correct value is to minimize the energy of the detail subband. This leads to:

$$L[p,q]=\tilde{H}[m0-\bar{d}_{m0}+d_{m0},n0-\bar{d}_{n0}+d_{n0}]+\sqrt{2}A[p,q] \quad (14)$$

such that:

$$\|\tilde{H}[m0-\bar{d}_{m0}+d_{m0},n0-\bar{d}_{n0}+d_{n0}]\|=\min(\|\tilde{H}[m-\bar{d}_m+d_m,n-\bar{d}_n+d_n]\|),\forall (m,n)\in(p,q) \quad (15)$$

where P(p,q) is the set of all pixels (m,n) in the current frame connected to the pixel (p,q) in the reference frame.

In practice, this minimization is implemented by associating a flag to each pixel in the low frequency subband: as the pixels in said subband are relocated to the previous frame, this flag is also associated to the corresponding location in the frame A. If there is no pixel in the current frame B connected to the considered pixel in the frame A, then the flag remains in the position "0". It is incremented each time a pixel from the current frame is pointing to the position in the reference frame associated with the flag.

If the flag has the value "0", the value in the high frequency subband is computed using the relation (12) and the value in the low frequency subband is computed using the relation (13). If the flag is not "0", at any time such a connection between A and B is established, the value in the high frequency subband is computed using the relation (12) as previously, and the absolute value is compared to the existing one. If said absolute value is lower than the absolute value of the previously computed high frequency value, it is used to update the low frequency value using the relation (13).

The present invention also relates to a method for decoding digital signals which have been coded by means of an encoding method such as described hereinabove. The order of operations carried out at the encoding side is reproduced at the decoder side for finding in the frame B the pixel connected to the considered pixel in the frame A and leading to the minimum energy high frequency subband.

What is claimed is:

1. A method for encoding a sequence of frames by means of a three-dimensional (3D) subband decomposition involving a spatial and temporal filtering step applied to the 3D spatio-temporal data which correspond to said sequence of frames considered as a 3D volume, said 3D subband decomposition being applied to successive groups of frames only after the implementation, on said sequence of frames, of motion estimation and compensation operations in the low temporal subbands at each level of the temporal decomposition, the compensation operation leading, among the filtered pixels, to double-connected pixels corresponding to regions becoming uncovered during motion, said method being further characterized in that it comprises the following steps:

(1) a motion compensated temporal filtering step between a previous reference frame A and a current frame B, said step itself comprising in a first time a computation sub-step of the high frequency subband, followed by a computation sub-step of the low frequency subband, using only the reference frame A and the previously computed high frequency subband, said computations being carried out according to the following relations:

$$H[m,n]=(B[m,n]-\tilde{A}[m-d_m,n-d_n])/\sqrt{2} \quad (a)$$

$$L[m-\bar{d}_m,n-\bar{d}_n]=\tilde{H}[m-\bar{d}_m+d_m,n-\bar{d}_n+d_n]+\sqrt{2}A[m-\bar{d}_m,n-\bar{d}_n] \quad (b)$$

for connected pixels, $$L[m,n] = \sqrt{2} \cdot A[m,n] \quad \text{(c)}$$

for unconnected pixels,
where (m,n) designates the position of the pixels, $H[m,n]$, $L[m,n]$ are temporal high -and low- subbands, $A[m,n]$, $B[m,n]$ are the consecutive previous and current frames, [dm, dn] is for a pixel the motion vector estimated between the frames A and B, $\bar{d}_m, \bar{d}_n$ an are the nearest integers to dm, dn, and $\tilde{A}, \tilde{H}$ are interpolated values (2) an identification step of said regions becoming uncovered as being related to double-connected pixels, those pixels leading to a minimum energy in the detail subband;

(3) a decision step, provided for choosing in the current frame, for the temporal filtering of a double-connected pixel of the reference frame, the corresponding pixel that leads to a minimum energy of the detail subband.

2. A method for decoding digital signals which have been coded by implementation of an encoding method according to claim 1, said decoding method being characterized in that the reconstruction of the pixels of the reference and current frames A and B is obtained by means of computation steps based on the values of the corresponding pixels in the low and high frequency subbands, said computations being made according to the following relations:

$$A[m - \bar{d}_m, n - \bar{d}_n] = \frac{1}{\sqrt{2}} (L[m - \bar{d}_m, n - \bar{d}_n] - \tilde{H}[m - \bar{d}_m + d_m, n - \bar{d}_n + d_n]) \quad \text{(a)}$$

(for connected pixels)

$$A[m, n] = \frac{1}{\sqrt{2}} \cdot L[m, n] \quad \text{(for unconnected pixels).} \quad \text{(b)}$$

$$B[m, n] = \sqrt{2} \, H[m, n] + \tilde{A}[m - d_m, n - d_n]. \quad \text{(c)}$$

\* \* \* \* \*